Aug. 13, 1968 W. T. STOI 3,397,294
APPARATUS FOR OPERATING PROGRESSIVE DIRECTION SIGNALING DEVICES
Filed May 6, 1964 2 Sheets-Sheet 1
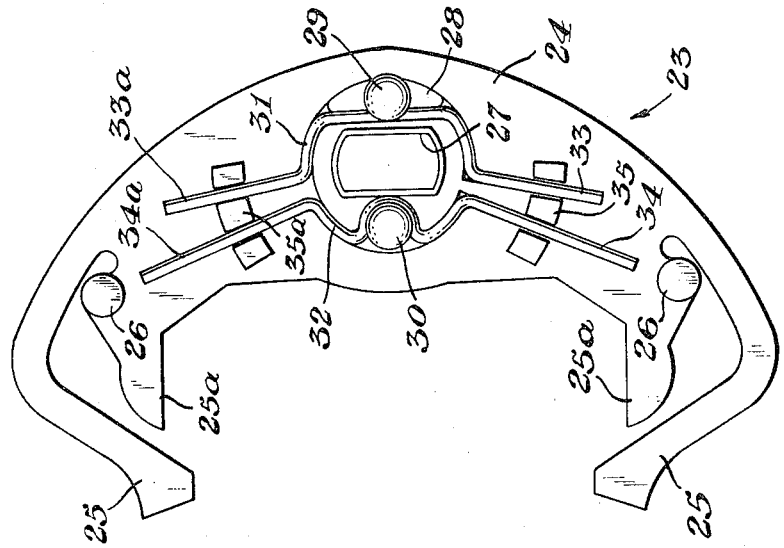
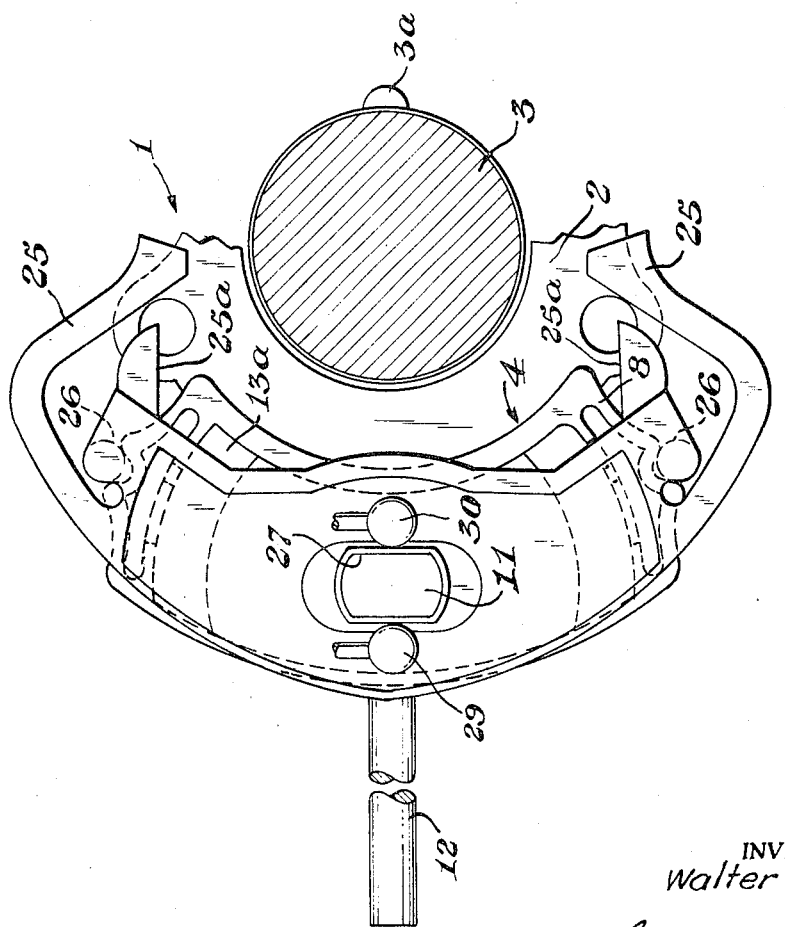
INVENTOR.
Walter T. Stoi
BY Learman & McCulloch
ATTORNEYS

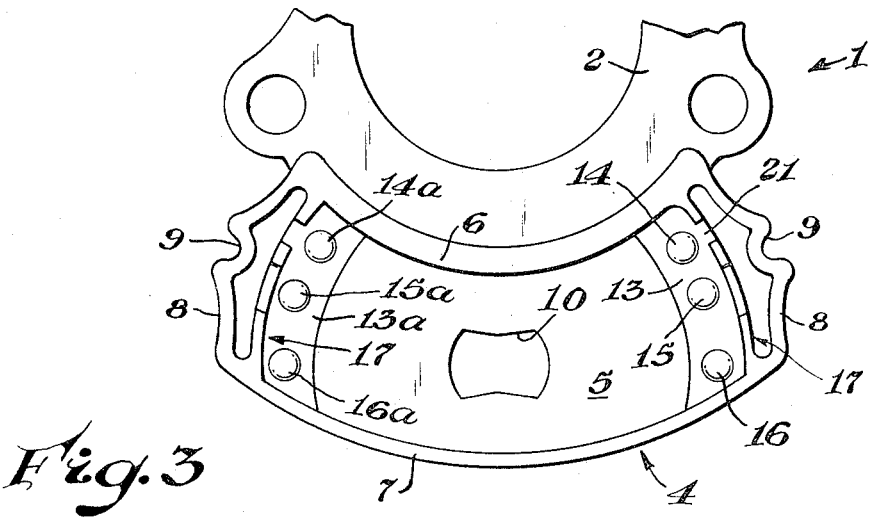
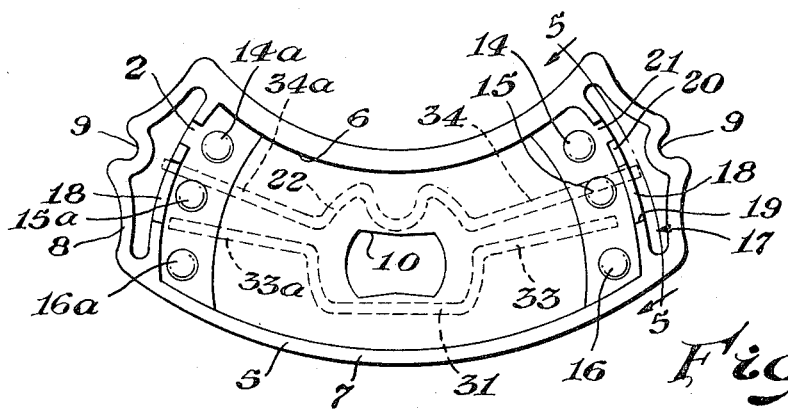
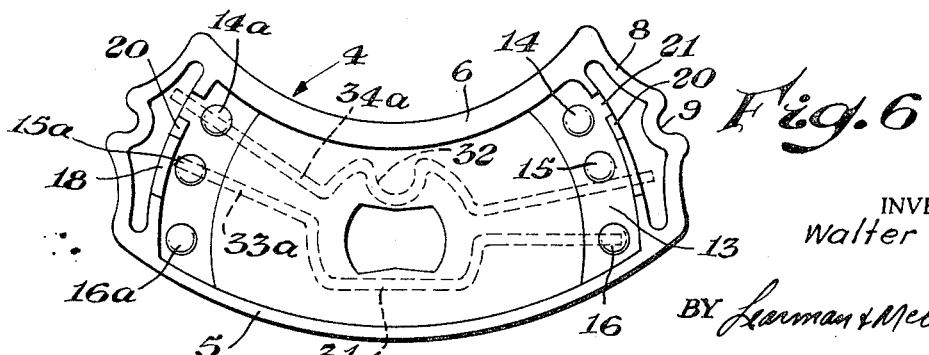

United States Patent Office 3,397,294
Patented Aug. 13, 1968

3,397,294
APPARATUS FOR OPERATING PROGRESSIVE
DIRECTION SIGNALING DEVICES
Walter T. Stoi, Warren, Mich., assignor to Boyne
Products, Inc., Boyne City, Mich., a corporation of
Michigan
Filed May 6, 1964, Ser. No. 365,371
11 Claims. (Cl. 200—61.3)

This invention relates to direction signaling apparatus for automotive vehicles and more particularly to a switch construction for self-cancelling direction signals of the so-called "progressive" type, wherein a plurality of signaling lights are actuated successively so as to provide a more positive and visible indication of an impending turn by a vehicle.

Direction signaling devices of a kind predominately in use heretofore function by flashing a vehicle's brake operated stop lamps and its parking lamps at one side or the other of the vehicle so as to indicate a turn in one direction or the other. For various reasons the intermittent flashing of such lights is not always as noticeable as is desirable. Accordingly, it is proposed to utilize a plurality of signaling lights at each side of a vehicle and to flash such lights at one side in succession to indicate a turn. For example, assume that it is desired to make a left-hand turn with a vehicle having three signaling lamps at the left rear, one of which is inboard, another of which is outboard, and the third of which is between the other two. With apparatus constructed in accordance with the invention, the inboard lamp will be flashed first, the intermediate lamp will be flashed second, and the outboard lamp will be flashed last, the cycle being repetitive so as to make more positive the indication of the turn.

An object of this invention is to provide a switch construction that is particularly adapted for use with such progressive direction signaling apparatus, but which is capable of use in other, nonprogressive apparatus.

Another object of the invention is to provide switch apparatus of the kind referred to which retains the advantages of direction signaling devices currently in use.

Other objects and advantages of the invention will be pointed out specifically or will become apparent from the following description when it is considered in conjunction with the appended claims and the accompanying drawings, in which:

FIGURE 1 is a fragmentary plan view of direction signaling apparatus constructed in accordance with the invention;

FIGURE 2 is a bottom plan view of an actuating member and the switching elements of the apparatus;

FIGURE 3 is a plan view of the support and casing member with the actuating member removed;

FIGURE 4 is a view similar to FIGURE 3, but illustrating in dotted lines the switching elements in their neutral positions;

FIGURE 5 is a sectional view taken on the line 5—5 of FIGURE 4; and

FIGURE 6 is a view similar to FIGURE 4, but illustrating the switching elements in one of the operating positions.

Apparatus constructed in accordance with the invention is generally similar to the apparatus disclosed in copending application, Ser. No. 131,243, filed Aug. 14, 1961, now patent No. 3,171,910 and to which reference is made for a more detailed description of the structure and operating characteristics of the direction signaling apparatus per se. Briefly, however, the direction signaling apparatus comprises a supporting member 1 formed of insulating material such as nylon, having a ring 2 adapted to be mounted in a housing (not shown) surrounding a rotatable steering shaft 3, and including an arcuate switch casing 4. The switch casing comprises a base 5 having inner and outer upstanding walls 6 and 7, respectively, and terminating at each of its ends in a flexible rib 8 that is so shaped as to provide an undulating surface having a detent 9 therein. Centrally of the casing 4 the base 5 is provided with a generally hour-glass shaped opening 10 for rockably accommodating a shaft 11 that is adapted to be rocked back and forth from a neutral position by means of an operating handle 12. Adjacent one end of the casing 4 is a slightly thickened portion or platform 13 on which is supported a plurality of spaced apart contacts 14, 15 and 16. At the opposite end of the casing are similar parts represented by similar reference characters, followed by the suffix a. The contacts are connected by suitable wiring to electrical signaling apparatus to be operated in a manner presently to be described. Preferably, the contacts are arranged on the arc of a circle having its center at the axis of rotation of the shaft 11, but true symmetry about the axis is not required.

The construction described thus far is practically identical to that disclosed in the aforementioned patent, except that the latter discloses but four switch contacts mounted in the casing. The instant construction also differs from the casing disclosed in the patent by the provision of a different upstanding wall 17 adjacent each end of the casing 4 and interposed between the rib 8 and the adjacent contacts. As is best shown in FIGURE 5, the major length of each wall 17 extends the full height of the casing. However, each wall 17 is provided with a notch 18 which terminates at one end in an upstanding shoulder 19 and at its other end in a downwardly inclined ramp 20 which, in turn, terminates at the level of the platform 13, thereby providing a deeper notch 21 that terminates abruptly in an upstanding wall 22.

The contacts 14–16 at opposite ends of the casing preferably have crowned heads which project uniformly above the surface of the platforms 13 and 13a. The contacts, therefore, may be said to be coplanar and to lie in a plane below the level of the notches 18, but above the level of the notches 21. The significance of this construction will be explained hereinafter.

The apparatus includes an actuating member 23 that overlies the casing 4 and is similar to the corresponding member disclosed in the heretofore mentioned patent. The actuator comprises an arcuate body 24 molded of insulating material such as nylon and terminating at each of its ends in an integral, flexible return finger 25, one or the other of which is adapted to be projected into the path of rotation of a canceling cam 3a that is mounted on the steering shaft 3 for rotation therewith. Adjacent each end of the actuator body 24 is a detent post or stud 26 which cooperates with the undulating surface of the adjacent rib 8 releasably to maintain the actuating member 23 in a neutral position indicated in FIGURE 1 or in either one of two operating positions located on opposite sides Adjacent each return finger 25 is an abutment 25a against which the finger may bear to effect return of the actuator to its neutral position from an operating position.

The actuator body is provided with an opening 27 between its ends having a shape corresponding substantially to the shape of the shaft 11. The shaft projects through the opening 27 and effects rocking of the actuator member about the axis of the shaft 11 in response to rocking of the latter.

Surrounding the opening 27 is a hub 28 on which is mounted a pair of contact posts 29 and 30. The contacts 29 and 30 are connected by suitable wiring to sources of electrical energy for purposes presently to be explained. The hub 28 is so shaped as to connect the latter to a pair of elongated, electrically conductive switching elements 31 and 32, the member 31 being in engagement with the contact 29 and the member 32 being in engagement with the contact 30. The element 31 includes a pair of arms 33, 33a that extend on opposite sides of the axle of rotation of the actuating member 23 and which are arranged to extend substantially radially from that axis a distance sufficient to engage any of the fixed contacts. The member 32 has a pair of similar arms 34, 34a similarly arranged, but the arms 34, 34a are substantially longer than the corresponding arms 33, 33a. The members 31 and 32 are flexible and resilient and may be formed of material such as beryllium copper alloy. The arms of the members 31 and 32 are maintained electrically isolated from one another and are prevented from undue flexing toward and away from one another by ribs 35, 35a integrally formed on the actuator body 24 on opposite sides of the axis of rotation, the ribs being slotted to accommodate the arms 33, 33a and 34, 34a.

The ribs 35 and 35a also function to limit rocking movement of the actuating member 23 from its neutral position to either of its operating positions. That is, rocking of the actuating member 23 either clockwise or counterclockwise from the position shown in FIGURE 1 will cause the rib 35a or 35, respectively, to engage the casing wall 6 and prevent further rocking of the actuator.

When the apparatus is conditioned for operation, the support member 1 will be mounted adjacent the steering shaft 3 and the actuating member 23 will be mounted on the support in a neutral position such that the return fingers 25 straddle the steering shaft 3 and are out of the path of the cam 3a. The switching elements 31 and 32 will be interposed between the casing and the actuating members and connected to the latter so as to be capable of moving relatively to the fixed switch contacts 14–16 in response to rocking movement of the actuating member from its neutral position to either of its operating positions, and return. When the actuating member 23 is rocked to one of its operating positions, one of the fingers 25 will be projected into the path of rotation of the cam 3a. Rotation of the cam in one direction will not effect restoration of the actuating member to its neutral position, but rotation of the steering shaft in the opposite direction will cause the cam to engage the projected finger 25 and urge the latter into engagement with the associated abutment 25a, whereupon the actuator will be rocked back to its neutral position.

When the actuating member 23 is in its neutral position, the switching elements 31 and 32 are in the positions shown in FIGURE 4. In these positions, the arms 34, 34a overlie and project beyond the fixed contacts at the opposite ends of the casing and are received by the slots 18 in the walls 17. As has been pointed out, the level of the slots 18 is such that the arms 34, 34a are supported above the level of the fixed contacts, thereby preventing engagement between the switching element 31 and the fixed contacts at opposite ends of the casing. The arms 33, 33a of the switching element 31 are shorter in length than the arms 34, 34a and, when the actuator is in its neutral position, rest upon the platform surfaces 13, 13a between the contacts 15, 16 and 15a, 16a, respectively. In the neutral position, the arms 34, 34a are positioned at the upper ends of the inclined ramps 20 of the walls 17, approximately midway between the abutments 19 and 22.

The arms of the switch elements 31 and 32 normally tend to lie in the same plane, but are capable of being sprung due to their resilience. Thus, when the actuating member is in its neutral position, the arms 34, 34a of the switching element 31 are sprung or deflected out of the plane they normally occupy by reason of their being supported on the walls 17. The flexing of the arms 34, 34a, therefore, stresses them so that they tend to move downwardly or toward the surface of the platforms.

When the actuating member 23 is rocked to one of its operating positions by manipulation of the handle 12, the switching elements 31 and 32 will be rocked with the actuator. For example, rocking of the actuator clockwise from the position shown in FIGURE 1 will effect corresponding movement of the switching elements 31 and 32 so as to relocate the latter in the positions indicated in FIGURE 6. In these positions, the arms 33 and 33a will make contact with the contacts 16 and 15a, respectively. The arm 34 of the switching element 32 will be moved toward the shoulder 19 of the notch 18 of its associated wall 17, but the arm 34a will be moved toward the wall 22 of the notch 21. As the arm 34a moves toward the wall of the notch 21, the resiliency or springiness of the arm will cause it to follow the downward inclination of the ramp 20 so as to effect engagement between the arm 34a and the contact 14a. A circuit thus will be completed from the contact 30 to and through the contact 14a and another circuit will be completed from the contact 29 to and through each of the contacts 16, 15a.

In practice, the contacts 16, 16a may be connected to flasher apparatus, the contacts 15, 15a may be connected to known devices for actuating progressive signaling mechanism that is connected to signaling lamps on opposite sides of a vehicle, the contacts 14, 14a may be connected to pilot lamps, and the contacts 29 and 30 may be connected to batteries or other power sources. These connections are mentioned by way of example only, since it would be possible to connect the various contacts in any desired manner to establish preferred circuits.

The disclosed embodiment is illustrative of a presently preferred form of the invention, but is intended to be illustrative rather than definitive thereof. The invention is defined in the claims.

I claim:

1. A switch construction comprising a support member; an actuating member mounted on said support member for rocking movements about an axis; a switching element connected to said actuating member for movement therewith and having a pair of flexible arms each of which extends substantially radially from said axis; a plurality of spaced apart pairs of fixed contacts supported by said support member in the path of movement of the arms of said switching element, said switching element being of such length that the arms thereof may span the distance between any pair of said contacts; and means supported by said support member in the path of movement of the arms of said switching element for deflecting said arms, thereby enabling engagement of said arms and selected ones of said contacts and preventing engagement between said arms and others of said contacts.

2. A switch construction comprising a support member; an actuating member mounted on said support member for rocking movements about an axis; a plurality of spaced apart pairs of fixed contacts supported on said support member on opposite sides of said axis; a first switching element connected to said actuating member for movement therewith and having a pair of arms extending on opposite sides of said axis toward said contacts; a second switching element electrically isolated from said first element and having a pair of arms extending on opposite sides of said axis toward said contacts, the arms of both of said switching elements being of such length as to span the distance between any pair of said contacts and the arms of one of said switching elements being flexible and of such length as to extend beyond said contacts; and means supported by said support member in the path of movement of the arms of said one of said switching elements for deflecting the arms thereof and selectively enabling and disabling engagement of said contacts and the arms of said one of said switching elements.

3. The construction set forth in claim 2 wherein said means comprises an upstanding wall having first portions thereof projecting above the level of said contacts and other portions thereof cut away to permit engagement between said contacts and the arms of said one of said switching elements.

4. The construction set forth in claim 3 wherein said first and other portions of said wall are joined by a smoothly inclined ramp.

5. Direction signaling apparatus of the self-canceling type in which the canceling means comprises cam means movable in a rotary path, said apparatus comprising a switch casing member; an arcuate actuating member terminating at its ends in flexible return fingers; means mounting said actuating member on said casing member for rocking movements relative thereto about an axis from a neutral position in which said fingers are clear of the path of said cam means, to either of two operating positions on opposite sides respectively of said neutral position and in which one or the other of said fingers is in the path of said cam means; a pair of electrically isolated switching elements connected to said actuating member for movement with the latter, each of said elements having a pair of arms extending toward the ends of said actuating member; a plurality of coplanar, fixed, spaced apart pairs of switch contacts supported by said casing member, the arms of at least one of said elements being flexible and each of said elements being of such length that the arms thereof may span the distance between any pair of said contacts; and means supported by said casing member in the path of movement of the arms of said one of said switching elements for deflecting the arms of said one of said switching elements and thereby preventing engagement thereof and certain ones of said contacts.

6. The apparatus set forth in claim 5 wherein said disabling means comprises an upstanding wall that deflects said arms out of the plane of said contacts.

7. The apparatus set forth in claim 5 wherein the arms of each of said switching elements extend radially from said axis toward opposite ends of said actuating member, and wherein said contacts are arranged on the arc of a circle having a center at substantially the axis of rocking of said actuating member.

8. A switch construction comprising a support member; an actuating member; means mounting said actuating member on said support member for relative movement therebetween; a member of spaced apart pairs of fixed contacts supported on one of said members; a plurality of switch elements connected to the other of said members for conjoint movement relative to said contacts in response to relative movement of said members, at least one of said switch elements being deflectable and each of said switch elements being of such length as to bridge the distance between and electrically connect any pair of said contacts; and means supported by said one of said members in the path of movement of said one of said switch elements for deflecting said one of said switch elements to prevent engagement thereof with more than one of said fixed contacts at any one time.

9. A switch construction comprising a support member; an actuating member mounted on said support member for rocking movements about an axis; a plurality of spaced apart pairs of fixed contacts mounted on said support member, the contacts of each pair of contacts being located on opposite sides of said axis; at least one deflectable switching element connected to said actuating member for rocking movements therewith, said switching element extending substantially radially from said axis and being of such length as to bridge the distance between and electrically connect any pair of said contacts; and means supported in the path of movement of said switching element for deflecting the latter to prevent engagement between said switching element and more than one contact of said pairs of contacts at any one time.

10. A switch construction comprising a support member; and actuating member mounted on said support member for movements relative thereto; a plurality of spaced apart pairs of fixed contacts supported on one of said members and lying all in the same plane; a flexible switching element connected to the other of said members whereby said switching element is movable relatively to said contacts in response to relative movement of said members, said switching element being capable of bridging the distance between and electrically connecting any pair of said contacts; and means supported in the path of said switching element and operable in response to movement of said actuating member to deflect the latter relative to the plane of said contacts to prevent engagement between said switching element and more than one contact of said pairs of contacts at any one time.

11. A switch construction comprising a support member; an actuating member mounted on said support member for rocking movements about an axis; a plurality of spaced apart pairs of fixed contacts mounted on said support member and lying all in the same plane; a flexible switching element extending substantially radially of said axis and connected to said actuating member for rocking movements therewith relative to said contacts, said switching element being of such length as to bridge the distance between and electrically connect any pair of said contacts; and means supported in the path of movement of said switching element and operable to deflect the latter relatively to the plane of said contacts to prevent engagement between said switching element and more than one of said contacts at any one time.

References Cited
UNITED STATES PATENTS 2,172,396    9/1939    Meuer _____ 200—15
3,171,911    3/1965    Brown _____ 200—6

BERNARD A. GILHEANY, *Primary Examiner.*

R. COHRS, *Assistant Examiners.*